United States Patent
Morris

(10) Patent No.: US 6,526,395 B1
(45) Date of Patent: Feb. 25, 2003

(54) APPLICATION OF PERSONALITY MODELS AND INTERACTION WITH SYNTHETIC CHARACTERS IN A COMPUTING SYSTEM

(75) Inventor: Tonia G. Morris, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,982

(22) Filed: Dec. 31, 1999

(51) Int. Cl.[7] .............................................. G06F 15/18
(52) U.S. Cl. ......................................... 706/20; 706/15
(58) Field of Search .............................. 706/15, 46, 20, 706/21

(56) References Cited

U.S. PATENT DOCUMENTS

| | | | |
|---|---|---|---|
| 5,608,839 A | * 3/1997 | Chen .......................... | 395/2.44 |
| 5,873,057 A | * 2/1999 | Eves et al. ................... | 704/201 |
| 5,987,415 A | * 11/1999 | Breese et al. ................ | 704/270 |
| 6,021,403 A | * 2/2000 | Horvitz et al. ................ | 706/45 |
| 6,185,534 B1 | * 2/2001 | Breese et al. ............... | 704/270 |
| 6,212,502 B1 | * 4/2001 | Ball et al. .................... | 704/270 |
| 6,230,111 B1 | * 5/2001 | Mizokawa .................. | 345/473 |
| 6,249,780 B1 | * 6/2001 | Mizokawa .................... | 706/11 |
| 6,430,523 B1 | * 8/2002 | Mizokawa .................. | 345/473 |

OTHER PUBLICATIONS

Perlin et al.; "Improv: A System for Scripting Interactive Actors in Virtual Worlds". Proceedings of the 23rd Annual Conference on Computer Graphics and Interactive Techniques, Apr. 1996, p. 205–216.*

Alm et al.; "Computer Aided Conversation for Serverely Physically Impaired Non–Speaking People". Conference on Human Factors and Computing Systems, May 1993, pp. 236–241.*

Shah et al.; "An Image/Speech Relational Database and its Application". IEE Colloquium on Itegrated Audio–Visual Processing for Recognition, Synthesis and Communication, Nov. 1996, p. 6/1–6/5.*

Yamada et al.; "Pattern Recognition of Emotion with Neural Network". Proceedings of the 1995 IEEE IECON 21st International Conference on Industrial Electronics, Control, and Instrumentation, Nov. 1995, vol. 1, p. 183–187.*

Kettebekov et al.; "Toward Multimodal Interpretation in a Natural Speech/Gesture Interface". Proceedings of the 1999 International Conference on Information Intelligence and Systems, Nov. 1999, p. 328–335.*

Duchnowski et al.; "Toward Movement–Invariant Automatic Lip–Reading and Speech Recognition". 1995 International Conference on Acoustics, Speech, and Signal Processing, May 1995, vol. 1, p. 109–112.*

Yoshitaka et al.; "SRAW: A Speech Rehabilitation Assistance Workbench–Speech Ability Evaluation by AudioVideo Input". IEEE International Conference on Multimedia Computing and Systems, vol. 2, pp. 772–777.*

Nakamura et al.; "MMD: Multimodal Multi–View Integrated Database for Human Behavior Understanding". Proceedings of the 3rd IEEE International Conference on Automatic Face and Gesture Recognition, Apr. 1998, p. 540–545.*

(List continued on next page.)

Primary Examiner—Emanuel Todd Voeltz
Assistant Examiner—Kelvin Booker
(74) Attorney, Agent, or Firm—Blakely, Sokoloff, Taylor & Zafman LLP

(57) ABSTRACT

An apparatus includes a video input unit and an audio input unit. The apparatus also includes a multi-sensor fusion/recognition unit coupled to the video input unit and the audio input unit, and a processor coupled to the multi-sensor fusion/recognition unit. The multi-sensor fusion/recognition unit decodes a combined video and audio stream containing a set of user inputs.

15 Claims, 4 Drawing Sheets

OTHER PUBLICATIONS

De Silva et al.; "Facial Emotion Recognition Using Multi-Modal Information". Proceedings of the 1997 International Conference on Information, Communication, and Signal Processing, Sep. 1997, vol. 1, p. 397–401.*

Brooke et al.; "Making Talking Heads and Speech–Reading with Computers". IEE Colloquium on Integrated Audio-Video Processing for Recognition, Synthesis and Communication, Nov. 1996, p. 2/1–2/6.*

Karaorman et al.; "An Experimental Japanese/English Interpreting Video Phone System". Proceedings of the $4^{th}$ International Conference on Spoken Language, Oct. 1996, vol. 3, p. 1676–1679.*

Boothe, H. H.; "Audio to Audio–Video Speech Conversion with the Help of Phonetic Knowledge Integration". 1997 IEEE International Conference on Systems, Man, and Cybernetics, Oct. 1997, vol. 2, p. 1632–1637.*

Chen et al., Multimodal Human Emotion/Expression Recognition, 3rd IEEE International Conference on Automatic Face and Gesture Recognition, Apr. 1998, pp. 366–371.*

Thalmann et al., Face to Virtual Face, Proceedings of the IEEE, May 1998, vol. 86, No. 5, pp. 870–883.*

Goto et al., Multimodal Interaction in Collaborative Virtual Environments, Proceedings of the 1999 International Conference o Image Processing, Oct. 1999, vol. 3, pp. 1–5.*

Kettebekov et al., Toward Multimodal Interpretation in a Natural Speech/Gesture Interface, Proceedings of the 1999 International Conference on Information Intelligence and Systems, Oct. 1999, pp. 328–335.*

Pavlovic', V., Multimodal Tracking and Classification of Audio–Visual Features, 1998 International Conference on Image Processing, Oct. 1998, vol. 1, pp. 343–347.*

Ostermann, J., Animation of Synthetic Faces in MPEG–4, Proceedings of Computer Animation 1998, Jun. 1998, pp. 49–55.*

Pavlovic' et al., Integration of Audio/Visual Information For Use In Human–Computer Intelligent Interaction, International Conference on Image Processing, Oct. 1997, vol. 1, pp. 121–124.*

Brooke et al., Making Talking Heads and Speech–Reading With Computers, IEE Colloquium on Integrated Audio–Visual Processing for Recognition, Synthesis and Communication, Nov. 1996, pp. 2/1–2/6.*

Brooke, N.M., Using The Visual Components In Automatic Speech Recognition, Proceedings of the 4th International Conference on Spoken Language, Oct. 1996, vol. 3, pp. 1656–1659.*

Miyake et al., A Gesture Controlled Human Interface Using an Artificial Retina Chip, IEEE Lasers and Electo–Optics Society Annual Meeting, Nov. 1996, vol. 1, pp. 292–293.*

Lavagetto et al., Synthetic and Hybrid Imaging In The Humanoid and Vidas Projects, International Conference on Image Processing, Sep. 1996, vol. 3, pp. 663–666.*

Guiard–Marigny et al., 3D Models of the Lips for Realistic Speech Animation, Proceedings of Computer Animation, Jun. 1996, pp. 80–89.*

* cited by examiner

APPLICATION OF PERSONALITY MODELS AND INTERACTION WITH SYNTHETIC CHARACTERS IN A COMPUTING SYSTEM

FIELD OF THE INVENTION

This invention is related to the field of use of artificial intelligence. More particularly, this invention is directed to application of personality models and interaction with synthetic characters in a computing system.

BACKGROUND

Computer systems attempting to provide more "human-like" interfaces often employ such technologies as speech recognition and voice control as command input interfaces, and synthesized speech and animated characters as output interfaces. In other words, these computers provide interactions through use of simulated human speech and/or animated characters.

Potential applications for these input/output interfaces are numerous, and offer the possibility of allowing people who are not computer proficient to use a computer without learning the specifics of a particular operating system. For example, an application may include a personality within the computer to simulate a personal assistant, thus creating a different interface to databases and/or schedules. In applications for entertainment, a system with these capabilities may implement role-playing in games, simulate interaction with historical figures for education purposes, or simulate interaction with famous rock singers or movie stars.

Currently, systems are focused on understanding speech content, and reacting to the words. Although this is a challenging endeavor in itself, once some of these obstacles are overcome, it will be important to also interpret other aspects of the interaction if it is desired to achieve a more natural interaction between humans and computers. Moreover, even if the state of the art of speech recognition dramatically improves, a combination of interfaces will increase the quality and the accuracy of the interface/interaction of the computer.

SUMMARY OF THE INVENTION

In one embodiment, an apparatus includes a video input unit and an audio input unit. The apparatus also includes a multisensor fusion/recognition unit coupled to the video input unit and the audio input unit, and a processor coupled to the multisensor fusion/recognition unit. The multisensor fusion/recognition unit decodes a combined video and audio stream containing a set of user inputs.

DESCRIPTION OF THE DRAWINGS

The present invention is illustrated by way of example and not limitation in the figures of the accompanying drawings in which like references indicated similar elements and in which.

DETAILED DESCRIPTION OF THE INVENTION

The present invention includes the use of personality models within a computing system and the sensing and display of emotional responses from and to the user from the perspective of a synthetic character based on a personality model. A combination of video and speech inputs is used for the interpretation of additional information from the user (emotion/mood content) and the combination of graphic and auditory outputs to project similar additional information to the user from a synthetic character.

The system may also provide "video-conferencing" with a synthetic character, whose thought, moods, intentions follow a basic personality model that can be subject to noise in the system for an element of seemingly human unpredictability.

The present invention provides for the capture and interpretation of user facial expressions and gestures, including use of emotional analysis for providing a more robust and useful user interface. In one embodiment, the user's facial movements are analyzed by the computer to allow such features as lip expressions, movements of eyebrows, and other physical expressions of emotions and communications to be used by the user to communicate with and/or control the computer.

The present invention also provides for the capture and interpretation of user facial expressions for image/video compression. Any emotional cues present in a person's face, whether displayed from a transmitted capture or displayed from a synthetic character, may be generated with the use of only a few parameters describing the emotional state of the person/character, thus reducing the necessary bandwidth for transmitting or storing the image data. Each emotion or mood could initiate a specific set of transformations of a person's or character's face, and could be individualized according the particular personality. The system provides:

1. Ability to recognize speech signals using auditory and video sensing;
2. Ability to detect and interpret user emotions via video and video capture;
3. Model of computer personality (in one embodiment, using rulebased methods with noise to bring element of unpredictability);
4. Library of image-processing functions which transform a person's face according to "emotion/mood" parameters;
5. Rendering capability and simulated video-conferencing interface such that the synthetic character responds with continuous movements; and,
6. Ability to display synthetic character's emotional state along with generated speech via combination of graphic and auditory output.

Figure 1:
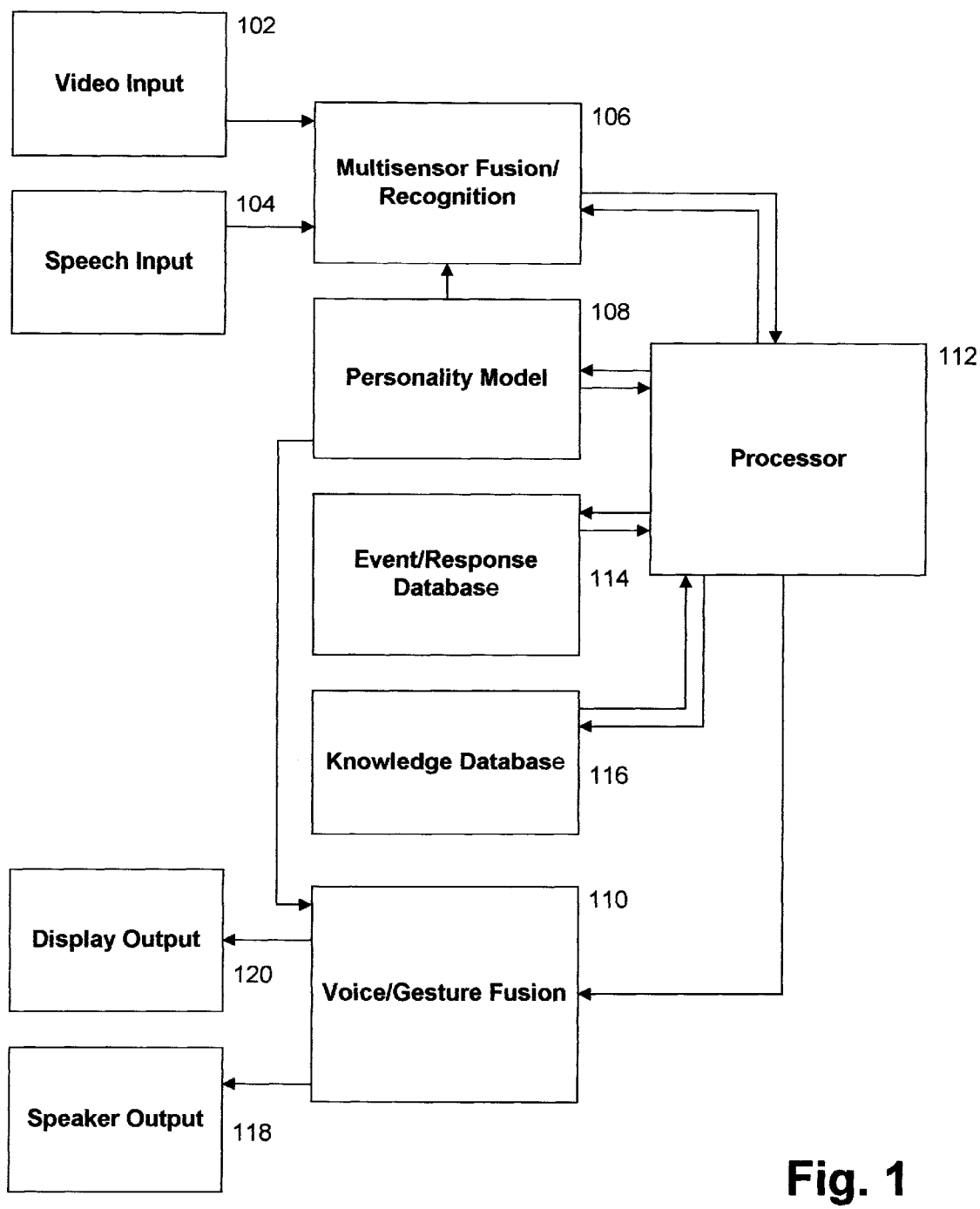
FIG. 1 is a block diagram of a system configured in accordance with one embodiment of the present invention.

FIG. 1 illustrates a system 100 configured in accordance with one embodiment of the present invention for capturing and responding to a user's emotional communication. System 100 includes a video input unit 102, and a speech input unit 104, both of which are coupled to a multi-sensor fusion/recognition unit 106. FIG. 1 also contains a personality model unit 108 coupled to multi-sensor fusion/recognition unit 106 and a voice/gesture fusion unit 110. A processor 112 is used to control the operation of system 100, and is coupled to multi-sensor fusion/recognition unit 106, personality model 108, voice/gesture fusion unit 110, event/response database 114, and a knowledge database unit 116.

Multi-sensor fusion/recognition unit 106 receives image data such as video and/or still image data from video input unit 102. Multi-sensor fusion/recognition unit 106 also receives audio input such as speech data from speech input unit 104. In one embodiment, multi-sensor fusion/recognition unit 106 contains the necessary hardware to process both the incoming image data stream and the audio data stream to extract any recognized facial expressions or gestures, and recognized verbal commands. For example, multi-sensor fusion/recognition unit 106 contains a speech recognition processor (not shown).

Multi-sensor fusion/recognition unit 106 provides the following outputs:

1. Recognized audio statement;
2. list of associated physical gestures;
3. face/voice description; and,
4. perceived meaning of statement and gesture/voice.

In one mode of operation, multi-sensor fusion/recognition unit 106 processes the audio data received from speech input unit 104 at the same time as it processes the image data from video input unit 102. Thus, a synchronized set of data including recognized voice and verbal commands associated with any facial or physical gesturing may be captured. In another embodiment, the audio data from speech input unit 104 is processed alone, and the image data from video input unit 102 is ignored. In yet another embodiment, only the image data from video input unit 102 is used, with the audio data from speech input unit 104 being ignored for recognition purposes.

Generally, multi-sensor fusion/recognition unit 106, video input unit 102, and speech input unit 104 are considered to be the input interface to system 100. Although FIG. 1 illustrates one potential division of functionality among video input unit 102, speech input unit 104, and multi-sensor fusion/recognition unit 106, other configurations may be possible. For example, the functionality provided by multi-sensor fusion/recognition unit 106 may be provided by a plurality of data processing and recognition devices.

Personality model unit 108 contains a set of personality models, each containing a set of parameters for influencing the behavior of the responses given by the personality or agent. In one embodiment, the set of parameters represents a range of scores for different personality traits, taken together which represent and quantifies a personality profile. The user may pre-select a particular personality model with which system 100 should adapt, or, in other cases, system 100 may automatically select an appropriate personality model.

Processor 112 determines the response of system 100 based upon the perceived input statements, the personality model being presented by personality model unit 108, event/response mapping database 116, and knowledge retrieved from knowledge database unit 116. In one embodiment, the personality model unit 108, event/response database 114, and knowledge database 116 are all updatable by processor 112. For example, new knowledge may be acquired through the perceived input statements or by special data transfers initiated by the user or automatically by system 100 as periodic updates.

Event/response database 114 contains a list of events (e.g., inputs), a list of responses (e.g., outputs), and a mapping of events to responses. Event/response database 114 provides system 100 with the full range of responses based on received inputs. For example, if a received event indicates that the user is unhappy, the personality representing system 100 may inquire as to whether there is anything the personality may do.

Knowledge database unit 116 contains such information as scientific and historical facts, language dictionaries, and mathematical rules. Knowledge database unit 116 may also contain such information as cultural rules and acceptable behavior/language information.

Voice/gesture fusion unit 110 receives the descriptions of responses and uses personality parameters to formulate voice inflections in the statements being output by system 100, and, in addition, any gestures synchronized with those statements. Display output 120 offers the display of the personality, whether it is represented as an animated figure or a sequence of video frames of a previously captured variety. Speaker output unit 118 presents audio output of system 100, which includes any speech synthesis of the data received from voice/gesture fusion unit 110. Generally, voice/gesture fusion unit 110, display output unit 120, and speaker output 118 handle the output of system 100.

Figure 2:
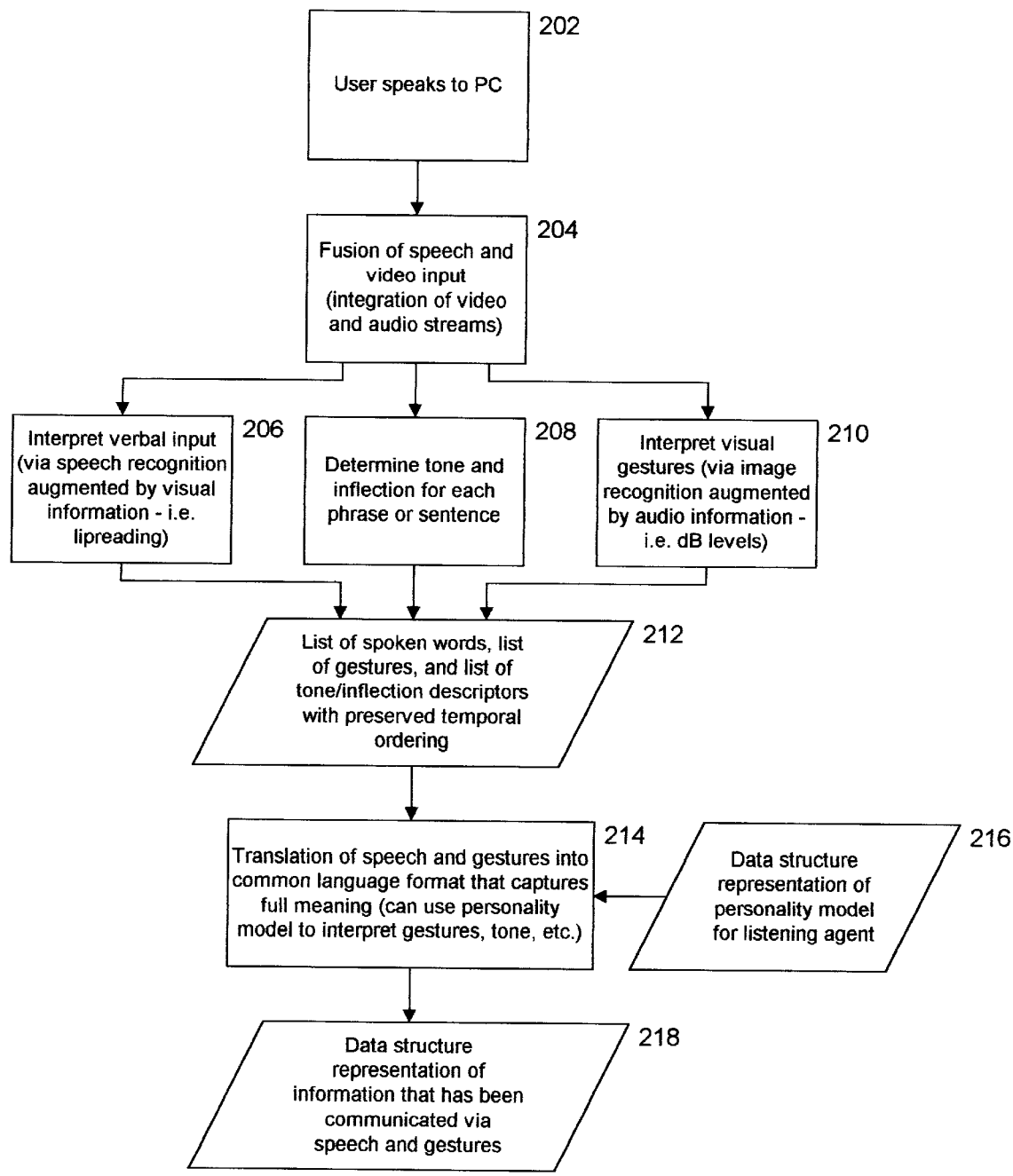
FIG. 2 is a flow diagram of one mode of operation of the system of FIG. 1 for input interpretation in accordance with one embodiment of the present invention.

FIG. 2 is a flow diagram describing one embodiment of an input interpretation process of system 100. In block 202, a user speaks to system 100. Specifically, system 100 captures the user's image with video input unit 102 and the user's speech with speech input unit 104.

In block 204, system 100 combines any captured speech or video and proceeds to process the combined data stream in multi-sensor fusion/recognition unit 106. In one embodiment, the processing is split into three parallel processes to minimize the time of processing.

In block 206, system 100 interprets any verbal input using the speech recognition functions of multi-sensor fusion/recognition unit 106. The speech recognition is supplemented by the visual information captured by video input unit 102, such as any interpreted facial expressions (e.g., lip-reading). A list of spoken words is generated from the verbal input.

In block 208, system 100 determines the tone and inflection for each phrase or sentence in the audio stream. The information is then stored in a list of tone/inflection descriptors.

In block 210, system 100 interprets visual gestures captured by the audio information captured from speech input unit 104. A list of gestures is generated from the processing performed by multi-sensor fusion/recognition unit 106.

In block 212, a data structure is generated containing the list of spoken words, the list of gestures, and the list of tone/inflection descriptors. In one embodiment, the temporal ordering of the data is preserved by using time code embedded throughout each list.

In block 214, the lists in block 212 are processed by system 100. The lists are translated into common language format that captures the full meaning of the input. In one embodiment, the information in personality model unit 108 is used to interpret any gestures or tones. In FIG. 2, the data structure representing this is shown as block 216.

In block 218, a data structure representing the extracted information is created. The data structure contains both information extracted from the speech data captured by speech input unit 104 and the gesture data captured by video input unit 102.

Figure 3:
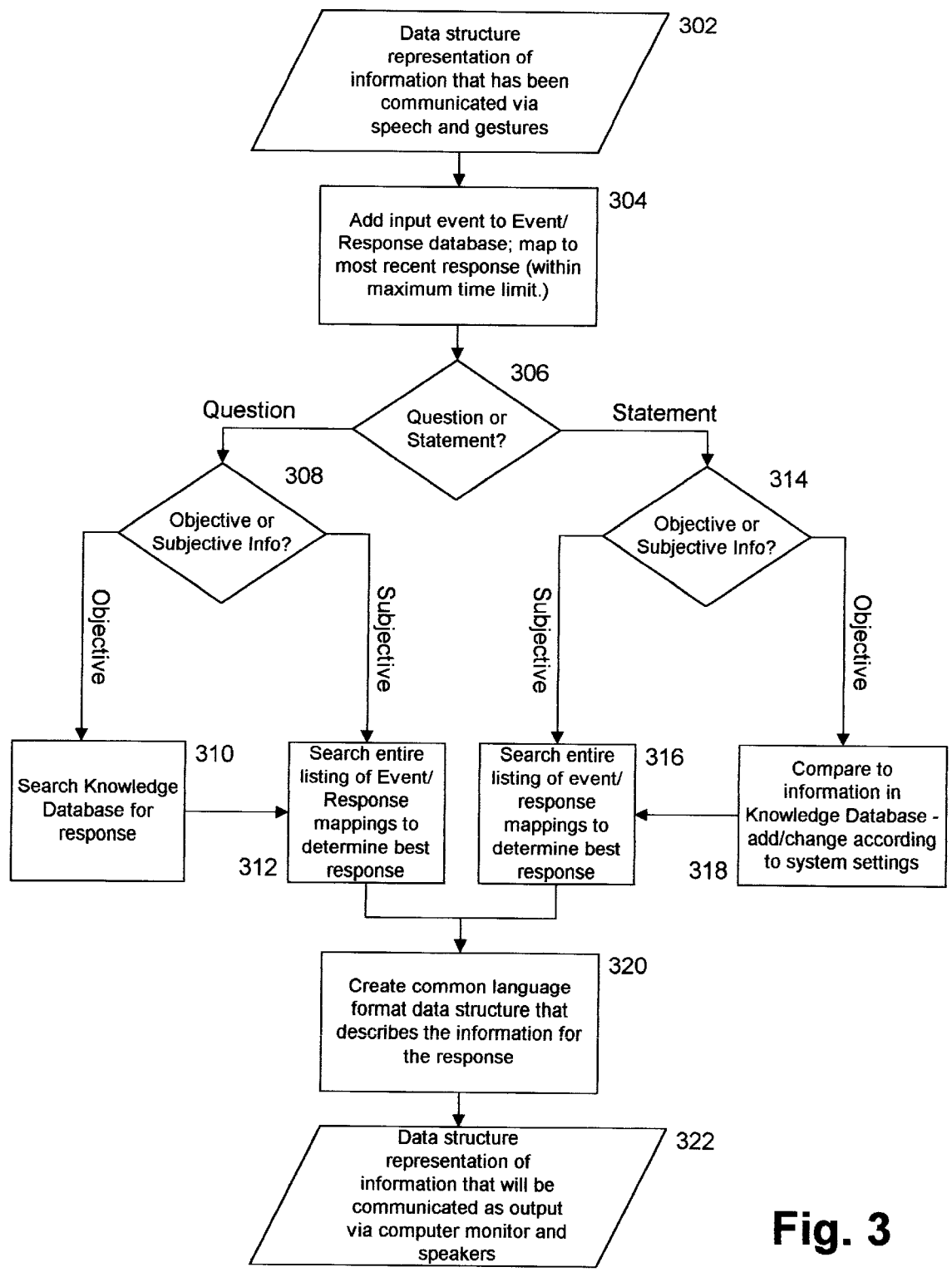
FIG. 3 is a flow diagram of one mode of operation of the system of FIG. 1 for determining a response in accordance with one embodiment of the present invention.

FIG. 3 is a flow diagram describing one embodiment of a process of determining a response by system 100. In block 302, the data structure representing the extracted information is retrieved and provided for processing in block 304.

In block 304, an input event based on the extracted information is added to event/response database 114. A response is then determined based on whether the extracted information relates to a question or a statement by the user.

In block 306, system 100 determines whether the user has asked a question or put forth a statement. If the user has asked a question, operation continues with block 308. Otherwise, operation continues with block 314.

In block 308, system 100 determines if the question the user has asked is objective or subjective. For example, the user may ask: "What is the weather in Phoenix, today?", an objective question, or the user may ask: "How do I look?", a subjective question. If the question is objective, operation continues with block 310. Otherwise, operation continues with block 312.

In block 310, system 100 searches knowledge database 116 for a response to the objective question. In one embodiment, if the answer is not located in knowledge database 116, additional resources such as the Internet may be searched. Once system 100 retrieves the answer, operation continues with block 312.

In block 312, where the user has asked a subjective question or system 100 has found an answer to the objective question asked by the user, system 100 searches event/response database 114 for the more appropriate response to the user's question.

Once a response has been formulated, system 100 creates a common language format data structure that describes the information contained in the response. This includes any text information as well as gesture and tone/inflection information to be presented by the personality represented by system 100. This structure is shown as block 322 in FIG. 3.

Returning to block 314, where it is determined that the user provided a statement in block 306, system 100 determines whether the statement is objective or subjective. If the statement made by the user is subjective, then operation continues with block 316. Otherwise, operation continues with block 318.

In block 318, system 100 compares the objective statement to the information contained in knowledge database 116. If the information provided by the user in the objective statement is different from the information contained in knowledge database 116, then knowledge database 116 may be changed as necessary. Operation then continues with block 316.

In block 316, where the statement made by the user is subjective, system 100 searches the entire listing of events/responses in events/response database 114 to determine the best response. Operation then continues to block 320, as described above.

Figure 4:
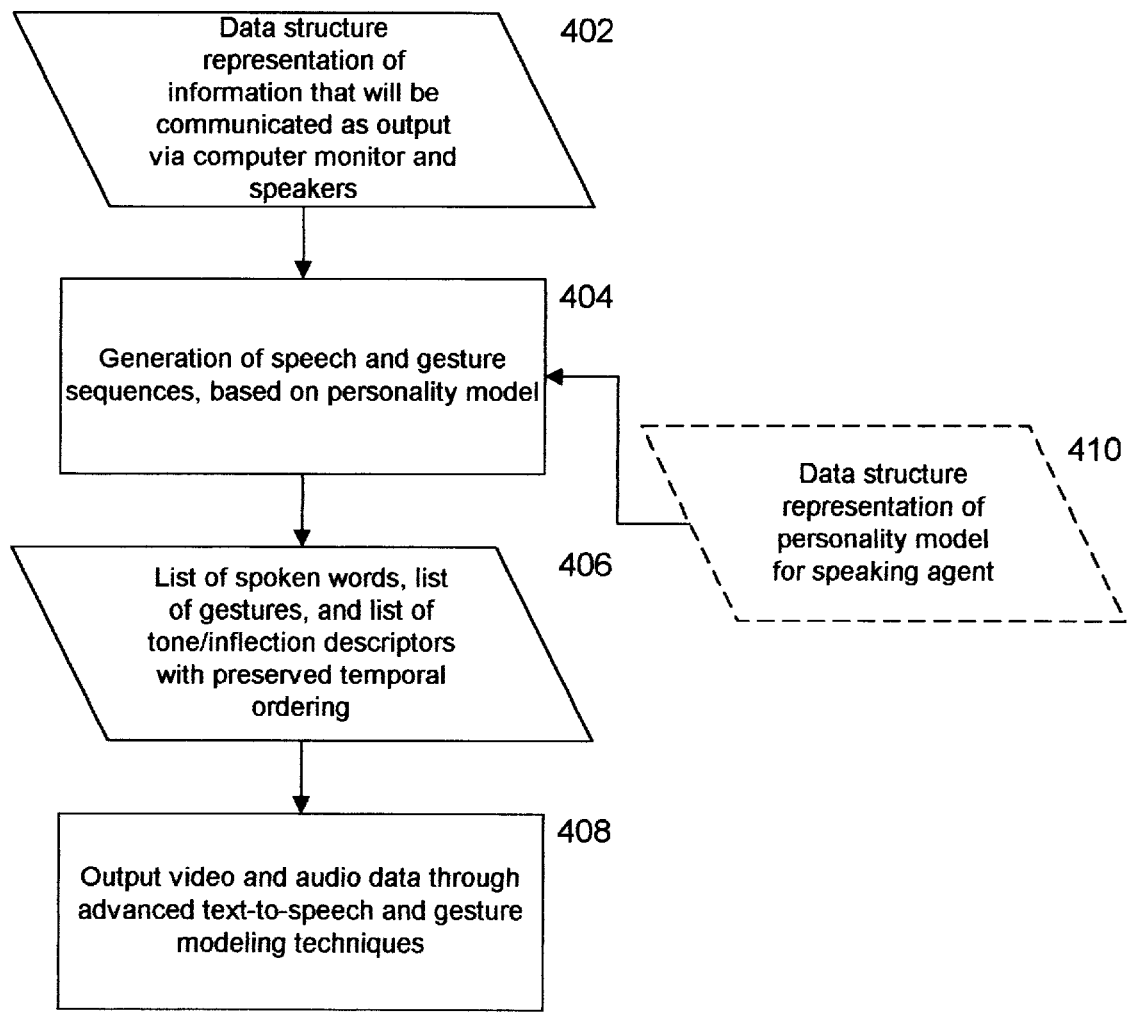
FIG. 4 is a flow diagram of one mode of operation of the system of FIG. 1 for output generation in accordance with one embodiment of the present invention.

FIG. 4 is a flow diagram describing one embodiment of an output generation process of system 100. In block 402, a data structure representation of information that is to be communicated as output via display output 120 and speaker output 118 is used as the basis for the response to be presented by system 100.

In block 404, system 100 generates speech and gesture sequences, based on the information contained in personality model unit 108. The sequences are generated in voice/gesture fusion unit 110 and includes the use of a data structure representing the personality model for the speaking agent (e.g., the personality model representing system 100). The data structure is shown as block 410 in FIG. 4.

A list of spoken words, a list of gestures, and a list of tone/inflection descriptors is generated in block 104. This is shown in block 406 of FIG. 4. In block 408, the information in block 406 is used to create output with display output unit 120 and speaker output unit 118. In one embodiment, the video and audio data is generated through gesture modeling and text-to-speech techniques, respectively.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus, comprising:
   a multiple-sensor recognition unit to receive and process image and audio data to capture one of a facial expression, a gesture and a recognized verbal command input from a user;
   an agent to provide responses to the user based on the captured one of a facial expression, a gesture and a recognized verbal command;
   a personality database containing a set of personality models, each model containing a set of parameters comprised of personality traits, wherein each personality trait is assigned a score and the set of parameters represents a range of scores to create a personality profile to influence the behavior of responses provided by the agent; and
   an event/response database to store previously captured facial expressions, gestures, and recognized verbal commands and previously given agent responses, from which the agent learns,
   wherein responses by the agent are based on the information stored in the event/response database, on current user inputs, and are subjected to noise to make the agent respond in a humanly unpredictable manner.

2. The apparatus of claim 1, further comprising:
   a speaker output unit; and
   a video output unit,
   wherein audio outputs for the speaker output unit and video outputs for the video output unit are based on the responses from the agent.

3. The apparatus of claim 1, further comprising:
   a knowledge database to store information that allows the agent to respond to factual and subjective questions from a user; and
   a link to an internet,
   wherein answers to factual questions not contained in the knowledge database are to be searched in the internet, retrieved and stored in the knowledge database to allow the agent to respond to factual questions not stored in the knowledge database.

4. The apparatus of claim 1, further comprising:
   a voice/gesture unit,
   wherein the voice/gesture unit is to receive information from the agent and information from the personality database to formulate voice inflections and gestures in the responses provided by the agent.

5. An apparatus, comprising:
   a multi-sensor recognition unit to receive and process image and audio data to simultaneously capture two of a facial expression, a gesture and a recognized verbal command input from a user;
   an agent to provide responses to the user based on the captured two of a facial expression, a gesture and a recognized verbal command;
   a personality database containing a set of personality models, each model containing a set of parameters comprised of personality traits, wherein each personality trait is assigned a score and the set of parameters represents a range of scores to create a personality profile to influence the behavior of responses provided by the agent; and
   an event/response database to store previously captured facial expressions, gestures, and recognized verbal commands and previously given agent responses, from which the agent learns, wherein responses by the agent are based on the information stored in the event/response database on current user inputs, and are subjected to noise to make the agent respond in a humanly unpredictable manner.

6. The apparatus of claim 5, further comprising:

a speaker output unit; and a video output unit, wherein audio outputs for the speaker output unit and video outputs for the video output unit are based on the responses from the agent.

7. The apparatus of claim 6, further comprising:

a knowledge database to store information to allow the agent to respond to factual and subjective questions from a user; and a link to an internet, wherein answers to factual questions not contained in the knowledge database are to be searched in the internet, retrieved and stored in the knowledge database to allow the agent to respond to factual questions not stored in the knowledge database.

8. The apparatus of claim 6, further comprising:

a voice/gesture unit, wherein the voice/gesture unit is to receive information from the agent and information from the personality database to formulate voice inflections and gestures in the responses provided by the agent.

9. A method, comprising:

receiving and processing image and audio data to capture one or more of a facial expression, a gesture and a recognized verbal command input from a user;

providing responses to the user from an automated agent, based on the captured one or more of a facial expression, a gesture and a recognized verbal command;

influencing a behavior of the responses provided by the agent using personality models, each model containing a set of parameters comprised of personality traits, wherein each personality trait is assigned a score and the set of parameters represents a range of scores to create a personality profile to influence the behavior of responses provided by the agent; and the agent learning from previously captured facial expressions, gestures, and recognized verbal commands and previously given agent responses, wherein the responses by the agent are based on past user inputs, current user inputs, and are subjected to noise to make the agent respond in a humanly unpredictable manner.

10. The method of claim 9, further comprising:

creating audio and visual outputs based on the responses from the agent.

11. The method of claim 10, further comprising:

the agent responding to factual and subjective questions from a user; and searching, retrieving and storing information from an internet to assist in responding to the factual questions.

12. The method of claim 10, further comprising:

receiving information to formulate voice inflections and gestures in the responses provided by the agent.

13. An article of manufacture, comprising:

a machine-accessible medium including data that, when accessed by a machine, cause the machine to perform operations including:

receiving and processing image and audio data to capture one or more of a facial expression, a gesture and a recognized verbal command input from a user;

providing responses to the user from an agent based on the captured one or more of a facial expression, a gesture and a recognized verbal command;

influencing a behavior of the responses provided by the agent using personality models, each model containing a set of parameters comprised of personality traits, wherein each personality trait is assigned a score and the set of parameters represents a range of scores to create a personality profile to influence the behavior of responses provided by the agent;

writing to memory previously captured facial expressions, gestures, and recognized verbal commands and previously given agent responses;

providing past user input information, current user input information to the agent from which the agent learns; and relaying noise to the agent to make the agent respond in a humanly unpredictable manner.

14. The article of manufacture of claim 13, wherein the machine-accessible medium further includes data that cause the machine to perform operations comprising:

searching for information on an internet to answer factual and subjective questions from the user.

15. The article of manufacture of claim 17, wherein the machine-accessible medium further includes data that cause the machine to perform operations comprising providing information to allow the agent to make responses with voice inflections and gestures.

* * * * *

UNITED STATES PATENT AND TRADEMARK OFFICE
CERTIFICATE OF CORRECTION

PATENT NO.    : 6,526,395 B1
DATED         : February 25, 2003
INVENTOR(S)   : Morris It is certified that error appears in the above-identified patent and that said Letters Patent is hereby corrected as shown below:

<u>Column 4,</u>
Line 37, before "by the audio", insert -- using video input 102. This interpretation may be augmented --.

Signed and Sealed this

Nineteenth Day of August, 2003

JAMES E. ROGAN
*Director of the United States Patent and Trademark Office*